June 26, 1956 D. H. PRITCHARD 2,752,417
SIGNAL OPERATED AUTOMATIC CONTROL CIRCUIT
Filed Aug. 21, 1953
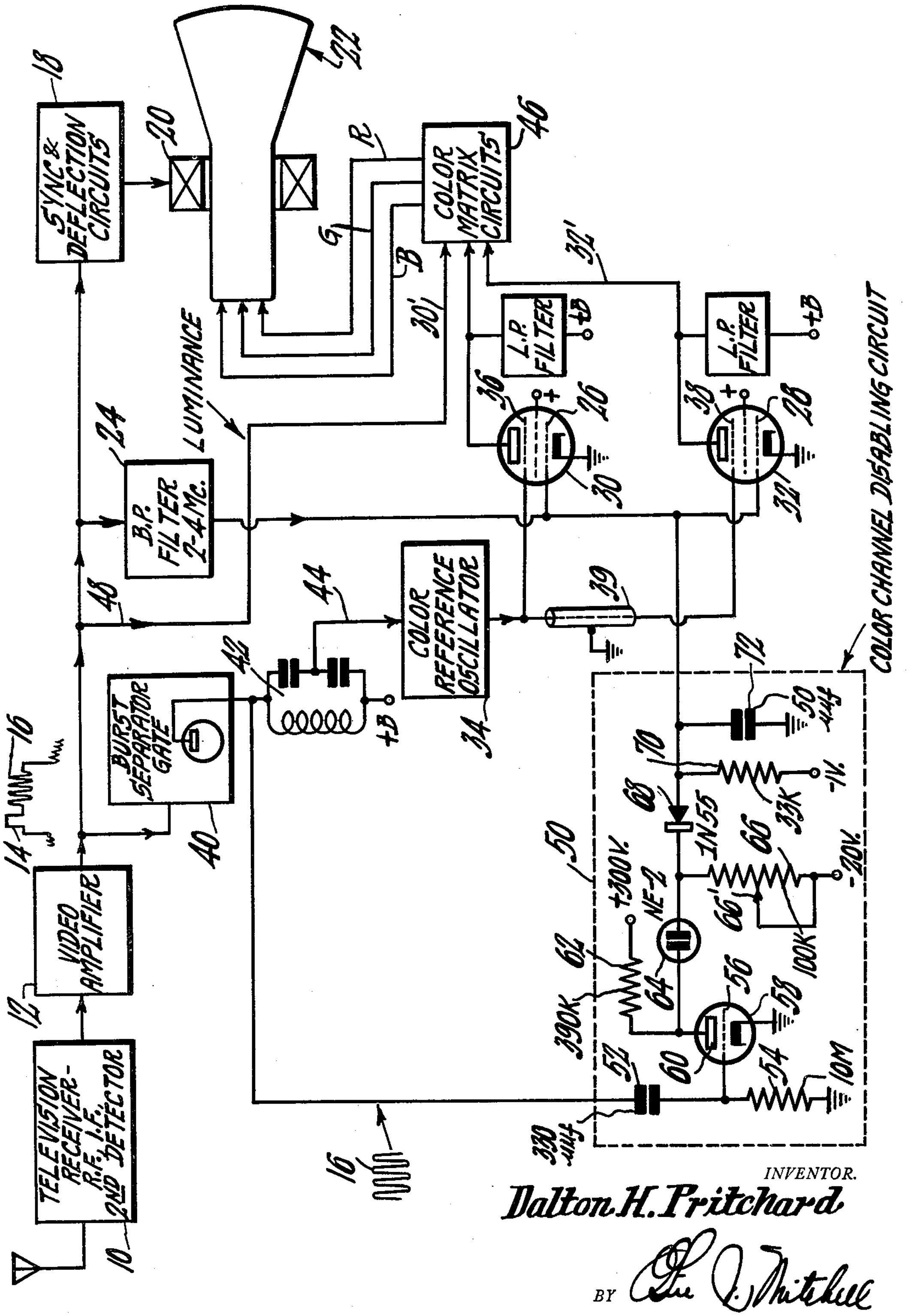
INVENTOR.
Dalton H. Pritchard
BY [signature]
ATTORNEY United States Patent Office 2,752,417

Patented June 26, 1956

2,752,417

SIGNAL OPERATED AUTOMATIC CONTROL CIRCUIT

Dalton H. Pritchard, Princeton, N. J., assignor to Radio Corporation of America, a Delaware corporation Application August 21, 1953, Serial No. 375,606

17 Claims. (Cl. 178—5.4)

The present invention relates to circuits for automatic switching between two modes of operation and, more particularly, although not necessarily exclusively, to new and improved apparatus for automatically turning on and off the color control circuits of a television receiver upon the reception of color or black and white television signals, respectively.

In accordance with certain proposed systems for the transmission and reception of color television images, luminance or brightness information regarding elemental areas of the televised image is transmitted by way of amplitude-modulation of a carrier wave, while information regarding the hue and saturation of the image areas is conveyed by phase- and amplitude-modulation of a color subcarrier wave whose frequency is generally spaced a fixed amount from the video carrier wave frequency. In order to detect the color information, it is necessary to provide some form of demodulating apparatus which, according to proposed systems, may comprise synchronous demodulating circuits which serve to compare the incoming subcarrier wave with the output wave of a color reference oscillator, thereby furnishing simultaneously information as to the phase and amplitude of the received subcarrier wave. In view of the importance of complete cooperation between transmitter and receiver in such a system, it will be appreciated that the color reference oscillator must be synchronized with extreme accuracy so that it produces a wave of exactly the same frequency and phase as that developed at the transmitter. In one method of operation, such synchronism is accomplished by the periodic transmission of a "burst" of signal wave equal to the frequency of the basic frequency of the phase modulated wave bearing the color information. A detailed description of the use of "burst" for color synchronization may be found in an article entitled "NTSC color-TV synchronizing signal" which appeared in the February 1952, issue of Electronics, published by McGraw-Hill Publishing Co., Inc. Briefly, a burst of subcarrier wave frequency which may, for example, be equal to 3.58 megacycles, may be superimposed on the "back-porch" of each horizontal blanking pulse.

Moreover, in order that the receiving apparatus designed for color television image reproduction may also serve to reproduce high quality black and white pictures when receiving ordinary monochrome television signals, the receiver may be arranged in such manner as to arrest or disable the color demodulating circuits when monochrome television signals are being received. Several forms of apparatus capable of accomplishing this result are described and claimed in the co-pending U. S. application of H. Kihn, filed May 1, 1950, S. N. 159,288, for "Multiplex Receiving Systems and Methods." Thus, it will be appreciated that the necessity for disabling the color demodulating or sampling portions of a "compatible" television receiver for the proper reception and reproduction of monochrome images has been heretofore recognized. Another form of color channel disabling circuit is described and claimed in the co-pending U. S. patent application of A. C. Schroeder and the present applicant, filed April 27, 1951, S. N. 223,258, now Patent No. 2,681,379, for "Signal Operated Automatic Color Control Circuits."

In general, it may be noted that prior inventions in the field to which the present invention appertains have come about in recognition of the fact that disabling of the sampling circuits of a color receiver during the reception of black and white image signals is necessary in order to prevent spurious color beat patterns from appearing in the monochrome reproduction as a result of random demodulation of high frequency picture and noise components appearing in the color channel. Attributes of a successful color disabling circuit are automatic detection of the presence or absence of the color synchronizing "bursts" (or other color flag) and noise immunity. The matter of noise immunity is of extreme importance in apparatus of the type in question, since it is essential that the color disabling circuit be prevented from responding to random noise impulses.

It is, therefore, a primary object of the present invention to provide novel automatic color channel disabling means with improved noise immunity.

Prior art color disabling circuits such as those set forth in the above-cited patent application have, for the most part, depended for noise immunity upon the provision of a rather large range of direct current control voltage derived from the presence of a burst signal and the utilization of only a relatively small portion of the range.

It is another object of the present invention to provide noise immune color channel disabling means, which means include, in addition to the gain characteristics of a control-voltage-developing circuit, an automatic switch which acts to open a circuit completely in the absence of color synchronizing bursts, so that only such random noise as possesses the requisite amount of energy equal to that of a burst can impair its desired operation, an eventuality which has been found to be extremely unlikely.

In general, the present invention contemplates a color channel disabling circuit including simplified double switching means capable of positive action regarding the switching on and off of the color channel circuits. More specifically, means are provided for detecting the presence of color synchronizing bursts whereby to develop a voltage sufficient to actuate a gas discharge device whose conduction, in turn, controls the conduction of a unilaterally conductive device for the purpose of changing the bias potential of the color demodulating stages. By virtue of the use of the gas discharge device in conjunction with the unilaterally conductive device, there is obtained, as will appear more fully hereinafter, greatly improved noise immunity over that heretofore available.

Additional objects and advantages of the present invention will become apparent to persons skilled in the art from a study of the following detailed description of the accompanying drawing which illustrates, by way of block and schematic diagram, a "compatible" color television receiver embodying the principles of the present invention.

In the drawing, there is illustrated a television receiver 10 having radio frequency, converter, intermediate frequency and video detector stages of any well known variety, the output of the second detector being applied to a video frequency amplifier 12 which serves to amplify the composite television signal including horizontal synchronizing pulses 14 and color synchronizing bursts 16 of the type described in the above-cited Electronics article. The synchronizing pulses 14 are separated by suitable means (not shown) from the remainder of the composite signal and are employed to synchronize the deflection or scanning circuits 18 whose output currents flow through the electromagnetic deflection coils 20 disposed in cooperative relationship with the tri-color image reproducing kinescope 22.

The output of the video frequency amplifier 12 also contains the phase- and amplitude-modulated color subcarrier of 3.58 megacycles, the subcarrier being separated as by means of a suitable bandpass filter 24 and applied simultaneously to the control electrodes 26 and 28 of multigrid demodulator tubes 30 and 32, respectively. Since the type of demodulator employed does not constitute a part of the present invention, it will be appreciated that any known variety may be substituted for those illustrated. A detailed description of the so-called single ended, multigrid color demodulator shown, however, may be found in an article entitled "Color television signal receiver demodulators" by D. H. Pritchard and R. N. Rhodes appearing in the June 1953 issue of RCA Review, page 205 et seq. A television receiver of a type to which the present invention is applicable is also described in that article, a block diagram thereof appearing on page 210. Briefly, however, the phase- and amplitude-modulated color subcarrier is applied to the control electrodes of the demodulator tubes and, assuming that the subcarrier has been modulated on its quadrature phases, by the color difference information, the color difference signals may be removed by simultaneously applying corresponding phases of subcarrier frequency from a color reference oscillator 34 to the suppressor electrodes 36 of the demodulator tubes 30 and 32, respectively. More specifically, the drawing illustrates a coupling between the color oscillator 34 and the suppressor electrode 36 as applying one phase of the reference frequency wave, while a wave 90° out of phase therewith is furnished to the suppressor electrode of tube 32 via a delay line 39, for example. The color reference oscillator 34 may comprise any well known stable oscillator capable of producing a 3.58 megacycle wave and is maintained in synchronism with the corresponding oscillator at the transmitter by means of the bursts 16 which are separated from the composite video signal by gate means 40 and applied via tuned circuit 42 and lead 44 to the oscillator 34.

The outputs of the demodulators 30 and 32 are applied via leads 30′ to a color matrix circuit 46 to which is also applied, along path 48, the luminance or brightness information of the composite video signal. As explained in the article entitled "Principles and development of color television systems" by G. H. Brown and D. G. C. Luck appearing in the June 1953 issue of RCA Review, page 144 et seq., the function of the color matrix circuits is that of deriving, from the color difference signals and the luminance signal, the three component color signals red, green and blue, for example, which are illustrated as being applied to the corresponding electron guns (not shown) of the tri-color image reproducing kinescope 22.

As thus far described, the apparatus shown in the drawing constitutes a well-known form of color television receiver capable of reproducing either color television images of high quality or monochrome images, depending upon the presence or absence of a phase- and amplitude-modulated color subcarrier in the received signal. As has been stated supra, the bursts 16 are present whenever the signal received is a color television signal but are absent, according to present day techniques, when the received signal is solely black and white as to its information content. In order that the color signal processing channel including the demodulator tubes 30 and 32 may be operative for the detection of color information during the reception of a color signal but inoperative when monochrome television signals are being received, the color channel disabling circuit illustrated within the dotted line block 50 is provided by the present invention. The block 50 includes a coupling network comprising capacitor 52 and resistor 54 for applying separated bursts from the output of gate circuit 40 to the control electrode 56 of triode 58. The anode 60 of triode 58 is connected via a load resistor 62 to a source of positive potential indicated as "+300" volts. Anode 60 is further connected to one electrode of a gas-filled neon tube 64 whose second electrode is connected to the upper terminal of a "threshold" adjusting resistance 66. The lower terminal of resistor 66 is connected to a source of negative potential of, for example, −20 volts, the purpose of which will be readily apparent hereinafter. The junction of neon bulb 64 and resistor 66 is connected to the cathode of a diode 68 illustrated as a crystal diode whose anode is connected to the upper terminal of a resistor 70. The lowermost terminal of the last-named resistor is connected to a source of potential indicated as −1 volt. The upper terminal of resistor 70 is also connected to ground via a large capacitor 72 and to the junction of the control electrodes 26 and 28 of demodulator tubes 30 and 32, respectively. For purposes of illustration, it may be assumed herein that the normal operating bias for demodulating tubes 30 and 32 is −1 volt although, as will be appreciated, the value indicated is merely by way of illustration.

In the operation of the color channel disabling circuit 50, assuming that the signal received constitutes a color television signal of the type described, the bursts 16 appearing at the output of the burst separator gate 40 constitutes "sense" or "flag" signals and are coupled from the tuned circuit 42 via the network comprising capacitor 52 and resistor 54 to the control electrode 56 of triode 58. The burst 16 thus impressed upon the triode 58 drives the tube into grid current so that a negative bias is developed across resistor 54, thereby causing anode current in the tube to approach cutoff, with the result that the potential at anode 60 approaches +300 volts (or, B+). The values of resistors 62 and 66 are selected and the latter is adjusted by means of the slider tap 66′ such that the direct current potential across the neon glow tube 64 is just sufficient to cause it to ignite and conduct. The two potentials in question here are, of course, the +300 volts to which the anode 60 of tube 58 is connected and the −20 volts to which resistor 66 is tied. Conduction of the neon tube 64 through resistor 66 causes the upper terminal of that resistor to become more positive, thereby applying a positive potential to the cathode of the crystal diode 68 and thus preventing the diode from conducting. With the diode 68 in an "open" or non-conducting state, the potential of −1 volt is applied via resistor 70 to the control electrodes 26 and 28 of demodulator tubes, permitting them to function in their normal manner. At this point, it should be noted that the R-C networks comprising capacitor 52 and resistor 54 as well as capacitor 72 and resistor 70 provide long time constants capable of maintaining the circuit in its described condition during intervals between successive bursts. Thus, it may be noted that when color television signals including synchronizing bursts are being received, the neon tube 64 provides a D.-C. coupling between the anode 60 of triode 58 and the crystal diode 68.

Assuming, on the other hand, that the signal being received is a standard monochrome signal which contains no bursts, no negative bias is developed across grid resistor 54 of triode 58, with the result that that tube conducts heavily through its load resistor 62. Such conduction of triode 68 causes its anode potential to drop considerably from its B+ value of 300 volts and, since, as has been stated, resistors 62 and 66 are selected and adjusted for threshold operation of the neon glow tube 64, the latter tube fails to conduct. With the neon tube 64 in a non-conductive state, there is effectively an open circuit between the anode of triode 58 and the upper terminal of resistor 66, so that the potential of −20 volts is applied to the cathode of diode 68, thereby causing it to conduct. Conduction of diode 68 through the D. C.

path including resistors 70 and 66 produces a voltage drop across resistor 70 such that the upper terminal thereof is rendered more negative. With the potentials shown (i. e., —1 volt and —20 volts) and the values of resistors 70 and 66, the potential actually applied to the control electrodes 26 and 28 of the demodulator tubes during conduction of the diode may be in the neighborhood of —10 volts which is sufficient to cut off the demodulators and thereby disable the color processing channel of the apparatus. So long as no bursts are present in the received signal, the neon tube 64 will remain non-conductive, permitting conduction of the diode with the resultant application of a cutoff potential to the demodulator tubes.

From the foregoing, it will be recognized that the color channel disabling circuit 50 possesses extremely high immunity to random noise which may be present in the signal. That is to say, assuming the received signal is a monochrome television signal without bursts, it would be necessary, in order for random noise to produce undesired response of the circuit 50 or the following conditions to obtain simultaneously: First, the noise would have to be of the proper frequency in order to pass through the tuned circuit 42 which is resonant at the subcarrier wave frequency of 3.58 megacycles. Second, the noise would have to occur at substantially the normal location of the color synchronizing bursts (i. e., on the back porch of the blanking pedestals). Finally, the noise would have to be of sufficient amplitude and duration to contain the requisite amount of energy for driving the triode 58 into grid current conduction. The foregoing prerequisites for noise are, moreover, in addition to the requirement that the noise be sufficient to overcome the difference in potentials applied to the diode 68. Since, in normal operation, it is extremely unlikely that all of the above-listed conditions would occur simultaneously, it should be readily apparent that the color channel disabling circuit 50 is possessed of excellent immunity to noise.

While the invention has been described in accordance with a specific embodiment employing a neon glow tube which is of extreme simplicity and slight cost, it should be borne in mind that the principles may be effectively realized through the use of other types of gas discharge devices. Thus, for example, the neon glow tube might be replaced by a gas diode or even by a grid-controlled gas discharge device such as a Thyratron. In the latter case, the control electrode of the Thyratron might be connected to the anode of triode 58, with the anode of the Thyratron being connected through a load resistor to a source of positive potential and directly to the junction of resistor 66 and the crystal diode 68. These modifications, it will be recognized, are within the scope of the present invention which provides a gas discharge device for providing a positively acting switch between the burst sensing device and the demodulator biasing circuit, so that the switch is closed during the reception of a color signal which includes bursts and opened for a signal which does not include bursts.

Additionally, it should be noted that, although the invention has been disclosed in connection with a specific circuit for disabling the color channel of a receiver by applying a cutoff bias to its demodulator tubes, the control voltage derived by the apparatus may be applied to other appropriate points in the color channel for producing the same result of disabling it. Examples of such other appropriate points may be found in the above-cited co-pending applications as well as in the co-pending application of E. O. Keizer, S. N. 241,291, filed August 10, 1951.

Having thus described my invention, what I claim as new and desire to secure by Letters Patent is:

1. A television receiver for providing one of two conditions of operation including color image reproduction and monochrome image reproduction, depending upon the reception of color television signals or monochrome television signals, such color signals including an indentifying waveform, said receiver comprising, means for separating such identifying waveform from a received color signal; a color signal processing channel for operating upon such received color signal to reproduce a color image; means for rendering said color channel inoperative during the reception of a monochrome signal, said latter means comprising a gas discharge device having a conducting and a non-conducting state; means coupled to said discharge device and to said waveform separating means and responsive to the output of said separating means for placing said discharge device into one of said states during the reception of a signal which includes such waveform and for placing said device into the other of its states during the reception of a signal lacking such identifying waveform; and means responsive to one of the states of said discharge device for developing a color channel disabling signal.

2. A television receiver for providing one of two conditions of operation including color image reproduction and monochrome image reproduction, depending upon the reception of color television signals or monochrome television signals, such color signals including an identifying waveform, said receiver comprising, means for separating such identifying waveform from a received color signal; a color signal processing channel for operating upon such received color signal to reproduce a color image; means for rendering said color channel inoperative during the reception of a monochrome signal, said latter means comprising a gas discharge device having a conducting and a non-conducting state; means coupled to said discharge device and to said waveform separating means for detecting such identifying waveform and placing said discharge device into one of said states during the reception of a signal which includes such waveform and for placing said device into the other of its states during the reception of a signal lacking such identifying waveform; and means responsive to one of the states of said discharge device for developing a color channel disabling signal.

3. A television receiver for providing one of two conditions of operation including color image reproduction and monochrome image reproduction, depending upon the reception of color television signals or monochrome television signals, such color signals including an identifying waveform, said receiver comprising, means for separating such identifying waveform from a received color signal; a color signal processing channel for operating upon such received color signal to reproduce a color image; means for rendering said color channel inoperative during the reception of a monochrome signal, said latter means comprising a gas discharge device having a conducting and a non-conducting state; means coupled to said discharge device and to said waveform separating means and responsive to the output of said separating means for placing said discharge device into one of said states during the reception of a signal which includes such waveform and for placing said device into the other of its states during the reception of a signal lacking such identifying waveform; and unilaterally conductive means responsive to the last named state of said discharge device for developing a color channel disabling signal.

4. The invention as defined by claim 1 wherein said last-named means comprises a diode and wherein conduction of said gas discharge device renders said diode non-conductive.

5. The invention as defined by claim 1 wherein said means for placing said discharge device into one of its states comprises a source of potential having predetermined maximum and minimum values depending upon whether or not such identifying waveform is present.

6. A television receiver for providing one of the two conditions of operation including color image reproduction and monochrome image reproduction, depending upon the reception of color television signals or monochrome television signals, such color signals including an identifying waveform, said receiver comprising, means for separating such identifying waveform from a received color signal; a color signal processing channel for operating upon such received color signal to produce a color image; means for rendering said color channel inoperative during the reception of a monochrome signal, said latter means comprising a gas discharge device; means coupled to said discharge device and to said waveform separating means and responsive to the output of said separating means for rendering said discharge device non-conductive during the reception of a signal lacking such identifying waveform and for rendering said discharge device conductive during the reception of a signal which includes such waveform; and means responsive to the non-conduction of said discharge device for disabling said color channel.

7. A television receiver for providing one of the two conditions of operation including color image reproduction and monochrome image reproduction, depending upon the reception of color television signals or monochrome television signals, such color signals including an identifying waveform, said receiver comprising, means for separating such identifying waveform from a received color signal; a color signal processing channel for operating upon such received color signal to reproduce a color image; means for rendering said color channel inoperative during the reception of a monochrome signal, said latter means comprising a gas discharge device; means coupled to said discharge device and to said waveform separating means and responsive to the output of said separating means for rendering said discharge device non-conductive during the reception of a signal lacking such identifying waveform and for rendering said discharge device conductive during the reception of a signal which includes such waveform; and unilaterally conductive means responsive to the non-conduction of said discharge device for disabling said color channel.

8. The invention as defined by claim 7 wherein said unilaterally conductive means comprises a diode and means for rendering said diode conductive when said gas discharge device is non-conductive.

9. In a television receiver for providing one of two conditions of operation including color image reproduction and monochrome image reproduction, depending upon the reception of color television signals or monochrome television signals, such color signals including an identifying waveform not present in such monochrome signal, means for separating such identifying waveform from a received color television signal; a color signal processing channel for reproducing a color image from such received color signal; and means for rendering said color channel inoperative during the reception of a monochrome signal, comprising a gas discharge device having a conducting and a non-conducting state; an amplifier having a conduction-controlling electrode and a load impedance connected to a source of substantially constant potential; means coupling said separating means to said conduction-controlling electrode of said amplifier; means coupling said load impedance to said gas discharge device in such manner as to place said discharge device in one of its states during the reception of a signal lacking such identifying waveform; and means responsive to one of the states of said discharge device for developing a color channel disabling signal.

10. The invention as defined by claim 9 wherein said last-named means comprises a unilaterally conductive device.

11. The invention as defined by claim 9 wherein said means coupling said separating means to said amplifier electrode comprises a long time constant network.

12. The invention as defined by claim 9 wherein said last-named means comprises a unilaterally conductive device and means for rendering it conductive for one state of said discharge device.

13. The invention as defined by claim 9 including means for biasing said discharge device to the verge of conduction.

14. The invention as defined by claim 9 wherein said last-named means includes means for biasing said discharge device to the verge of conduction.

15. The invention as defined by claim 9 wherein said discharge device is coupled to said amplifier load impedance in such manner as to be rendered conductive during the reception of such identifying waveform.

16. The invention as defined by claim 15 wherein said means responsive to the state of conduction of said discharge device comprises a unilaterally conductive device and means for rendering said unilaterally conductive device conductive during non-conduction of said discharge device.

17. In a television receiver for providing one of two conditions of operation including color image reproduction and monochrome image reproduction, depending upon the reception of color television signals or monochrome television signals, such color signals including an identifying waveform not present in such monochrome signal, means for separating such identifying waveform from a received color television signal; a color signal processing channel for reproducing a color image from such received color signal; means for rendering said color channel inoperative during the reception of a monochrome signal, said last-named means comprising an electronic switch having a conducting and a non-conducting state; an amplifier having a conduction-controlling electrode and a load impedance connected to a source of substantially constant potential; means coupling said separating means to said conduction-controlling electrode of said amplifiers; means coupling said load impedance to said electronic switch in such manner as to place said switch in one of its states during the reception of a signal having such identifying waveform and the other of its states during the reception of a signal lacking such identifying waveform; and means responsive to the last-named state of said electronic switch for developing a color channel disabling signal.

References Cited in the file of this patent

UNITED STATES PATENTS

| | | |
|---|---|---|
| 2,653,787 | Luck | Sept. 22, 1953 |
| 2,681,379 | Schroeder | June 15, 1954 |
| 2,692,908 | Jepmond | Oct. 26, 1954 |